(12) United States Patent
Kini et al.

(10) Patent No.: US 12,534,481 B2
(45) Date of Patent: Jan. 27, 2026

(54) CONTINUOUS FLOW PROCESS FOR PREPARATION OF ACEPHATE AND ITS INTERMEDIATES

(71) Applicant: UPL LTD, Mumbai (IN)

(72) Inventors: Prashant Vasant Kini, Mumbai (IN); Supratim Roy Sarkar, Mumbai (IN)

(73) Assignee: UPL LTD, Mumbai (IN)

( * ) Notice: Subject to any disclaimer, the term of this patent is extended or adjusted under 35 U.S.C. 154(b) by 849 days.

(21) Appl. No.: 17/793,172

(22) PCT Filed: Jan. 25, 2021

(86) PCT No.: PCT/IB2021/050540
§ 371 (c)(1),
(2) Date: Jul. 15, 2022

(87) PCT Pub. No.: WO2021/152443
PCT Pub. Date: Aug. 5, 2021

(65) Prior Publication Data
US 2023/0339989 A1    Oct. 26, 2023

(30) Foreign Application Priority Data

Jan. 31, 2020 (IN) .............................. 202021004454

(51) Int. Cl.
*B01J 19/00* (2006.01)
*C07F 9/24* (2006.01)

(52) U.S. Cl.
CPC .......... *C07F 9/2487* (2013.01); *B01J 19/0093* (2013.01); *B01J 2219/00033* (2013.01); *B01J 2219/00867* (2013.01); *B01J 2219/00961* (2013.01); *B01J 2219/00963* (2013.01); *B01J 2219/00984* (2013.01)

(58) Field of Classification Search
CPC ................. C07F 9/2487; B01J 19/0093; B01J 2219/00033; B01J 2219/00867; B01J 2219/00961; B01J 2219/00963; B01J 2219/00984
USPC ....................................................... 558/144
See application file for complete search history.

(56) References Cited

FOREIGN PATENT DOCUMENTS

| CN | 101289462 B | 12/2010 |
| CN | 102060872 A | 5/2011 |

OTHER PUBLICATIONS

International Search Report and Written Opinion for International Application PCT/IB2021/050540; Application Filing Date: Jan. 25, 2021; Date of Mailing: Mar. 29, 2021; 9 pages.

*Primary Examiner* — Kristin A Vajda
(74) *Attorney, Agent, or Firm* — CANTOR COLBURN LLP

(57) ABSTRACT

The present invention relates to a continuous flow process for synthesis of acephate and its intermediates. The present invention more particularly relates to synthesis of acephate and its intermediates in a microreactor system.

12 Claims, 3 Drawing Sheets

Stage-1] Isomerization of DMPAT to MMD in microreactor

Stage-2] Acylation of MMD to Acephate in microreactor

Stage-3] Recovery of Acetic Acid

Stage-4] Isolation of pure Acephate

CONTINUOUS FLOW PROCESS FOR PREPARATION OF ACEPHATE AND ITS INTERMEDIATES

CROSS REFERENCE TO RELATED APPLICATIONS

This application is a National Stage application of PCT/IB2021/050540, filed Jan. 25, 2021, which claims priority to Indian Patent Application number 202021004454 filed Jan. 31, 2021, both of which are incorporated by reference in their entirety herein.

FIELD OF THE INVENTION

The present invention relates to a continuous flow process for synthesis of acephate and its intermediates. The present invention more particularly relates to synthesis of acephate and its intermediates in a microreactor system.

BACKGROUND OF THE INVENTION

Acephate (N-(Methoxy-methylsulfanylphosphoryl) acetamide) an organophosphorus compound, is a very desirable insecticide in the agrochemical world. It is used to control a wide range of chewing and sucking insects, e.g. aphids, thrips, lepidopterous larvae, sawflies, leaf miners, leafhoppers, cutworms, etc., in fruit (including citrus), vines, hops, olives, cotton, soya beans, peanuts, macadamia nuts, beet, brassicas, celery, beans, potatoes, rice, tobacco, ornamentals, forestry, and other crops.

As an improvement in the synthesis of acephate and their intermediates, various other processes have been tried in the prior art.

Commonly the processes disclosed in the art are batch processes, which can require intermittent introduction of frequently changing raw materials, varying process conditions within the vessel, and different purification methods. Typically, in batch processing, vessels are often idle while waiting for raw materials or undergoing quality control checks and cleaning.

Different methods in batch process have been tried, however still there are problems for example acephate degradation problem, process reaction without solvent is very difficult due to high exothermicity in batch process, low yield and purity.

These and similar disadvantages make the prior art processes not feasible for an industrial and commercial scale production thereby not suitable for economic and environmental objectives. Therefore, there is a need existing in the art for simple and rapid process for preparation of acephate.

Continuous flow processes allow a constant feed of raw materials to the process vessel and continual product withdrawal. Continuous flow process is very promising recent micro reaction technology, as it offers, as compared to the traditional batch system, a very uniform residence time, much better thermal control, and a lower hold-up, leading to a significant step change in terms of chemical yield and selectivity, and safety. Continuous flow microreactors are now widely used in labs for testing and developing new routes of synthesis. For laboratory and development work, they offer a very small hold-up with a sufficient residence time, leading to a very small use of material for testing, which is of particular interest in the development phase, shortening the time required to make a requested quantity, and when the raw material is expensive. In addition, the small amount of material involved reduces safety and environmental risks significantly.

There exists a need to develop a simple and commercially viable process for the preparation of acephate and its intermediates. The present invention provides an industrially viable process for preparation of acephate, such as a continuous process producing acephate in high yield and purity by overcoming the difficulties of the prior art. Thus, the present invention involves technical advance as compared to the existing knowledge or having economic significance or both and that makes the invention not obvious to a person skilled in the art. In present continuous process the reaction can be performed without solvent and the problem such as degradation of acephate, exothermicity, purity of the product and acetic acid recovery are solved according to the present invention.

OBJECTS OF THE INVENTION

An object of the present invention is to overcome or ameliorate at least one of the above disadvantages of the prior art processes and to provide a process for preparation of acephate by continuous flow process.

Another object of the present invention is to provide a process for the preparation of acephate in a microreactor system.

Yet another object of the invention is to provide a commercially viable, economical, friendly and continuous flow process for synthesis of acephate, by reducing unfavorable environmental effects.

Still another object of the invention is to provide a simple and rapid continuous flow process for the synthesis of acephate in high yield and purity.

An important advantage of the present invention is that the reaction is operated in continuous manner in a microreactor without any solvent and the capacity of the production of the desired product can be increased by connecting two or more reactors in a simplified and friendly manner. Also, during the reaction high volume of sodium acetate is generated and lead to major difficulties on a large scale, this and other problems are solved by present invention. Further, during isomerisation and acetylation stages heat transfer, heat removal and agitation in the reactor are key problems making the process not suitable for commercial scale-up, this problem is solved by operating the process in continuous flow reactor. Additionally, neutralization stage requires high amount of ammonia. Surprisingly, the present inventors found that such problems can be overcome by the process of this invention.

SUMMARY OF THE INVENTION

In an aspect the present invention provides a process for preparation of acephate by a continuous flow process.

In another aspect the present invention provides a process for preparation of acephate wherein said process comprises isomerising O, O-dimethyl phosphoramidothioate (DMPAT) using dimethyl sulphate in a microreactor system and continuously producing O,S-dimethyl phosphoramidothioate (MMD).

In another aspect the present invention provides a process for preparation of acephate comprising acetylating MMD in a microreactor system and continuously producing acephate.

In another aspect the present invention provides a process for the synthesis of acephate comprising isomerising DMPAT using dimethyl sulphate in a microreactor and continuously producing MMD followed by acetylating MMD in a microreactor and continuously producing acephate in a microreactor system in the absence of solvent.

In another aspect the present invention provides a process for preparation of acephate comprising isomerising O, O-dimehyl phosphoramidothioate using dimethyl sulphate in a microreactor for continuously producing O,S-dimethyl phosphoramidothioate and acetylating O,S-dimethyl phosphoramidothioate in a microreactor for continuously producing acephate.

In another aspect of the present invention there is provided a continuous flow process for preparation of acephate comprising:
- charging O, O-dimehyl phosphoramidothioate through a first line of a microreactor unit, in a continuous flow;
- charging dimethyl sulphate through a second line of the microreactor unit, in a continuous flow;
- reacting O, O-dimehyl phosphoramidothioate and dimethyl sulphate in a microreactor to form a product stream of O,S-dimethyl phosphoramidothioate.

In another aspect of the present invention there is provided a continuous flow process for preparation of acephate comprising:
- charging O,S-dimethyl phosphoramidothioate through a first line of a microreactor unit, in a continuous flow;
- charging an acetylating agent through a second line of the microreactor unit, in a continuous flow;
- reacting O,S-dimethyl phosphoramidothioate with acetylating agent in a microreactor to form a product stream of acephate.

In another aspect of the present invention there is provided a continuous flow process for preparation of acephate comprising:
i) charging O, O-dimehyl phosphoramidothioate through a first line of a microreactor unit, in a continuous flow;
ii) charging dimethyl sulphate through a second line of the microreactor unit, in a continuous flow;
iii) reacting O, O-dimehyl phosphoramidothioate and dimethyl sulphate in a microreactor to form a product stream of O,S-dimethyl phosphoramidothioate;
iv) charging a stream of O,S-dimethyl phosphoramidothioate to a continuous microreactor, in a continuous flow;
v) charging acetylating agent to a continuous microreactor, in a continuous flow;
vi) acetylating O,S-dimethyl phosphoramidothioate with acetylating agent in a microreactor to form a product stream of acephate.

In another aspect of the present invention there is provided a continuous recovery of acetic acid from continuous process for preparation of acephate.

BRIEF DESCRIPTION OF DRAWINGS

The drawings described herein are for illustrative purposes only of selected embodiments and not all possible implementations and are not intended to limit the scope of the present disclosure.

DETAILED DESCRIPTION OF THE INVENTION

Figure 1A:
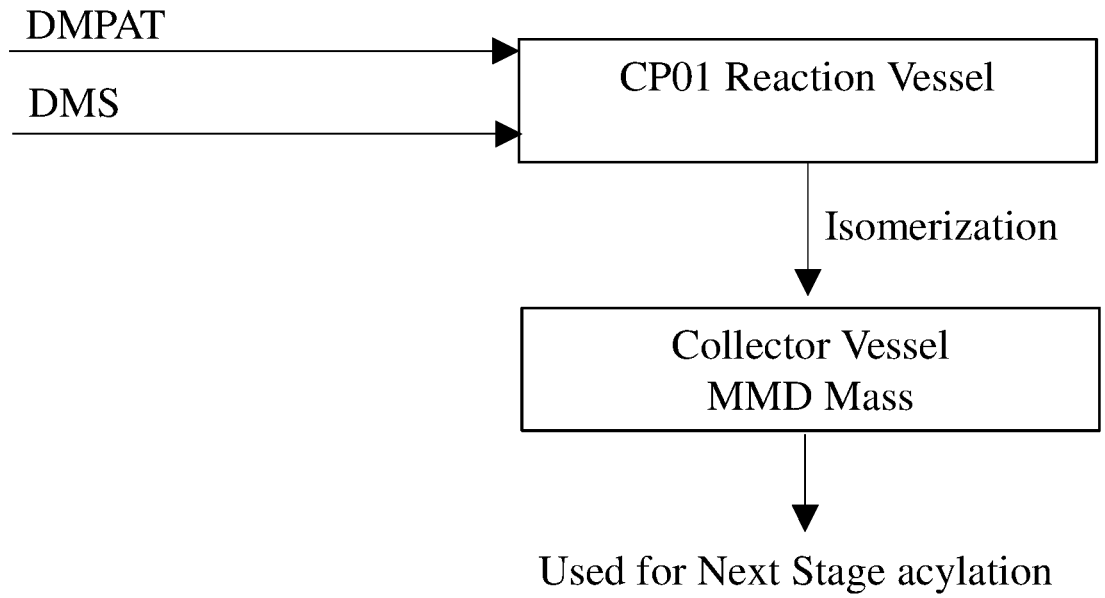
FIG. 1(A-D): It is a process flow diagram for producing acephate according to one embodiment of invention.
Figure 1B:
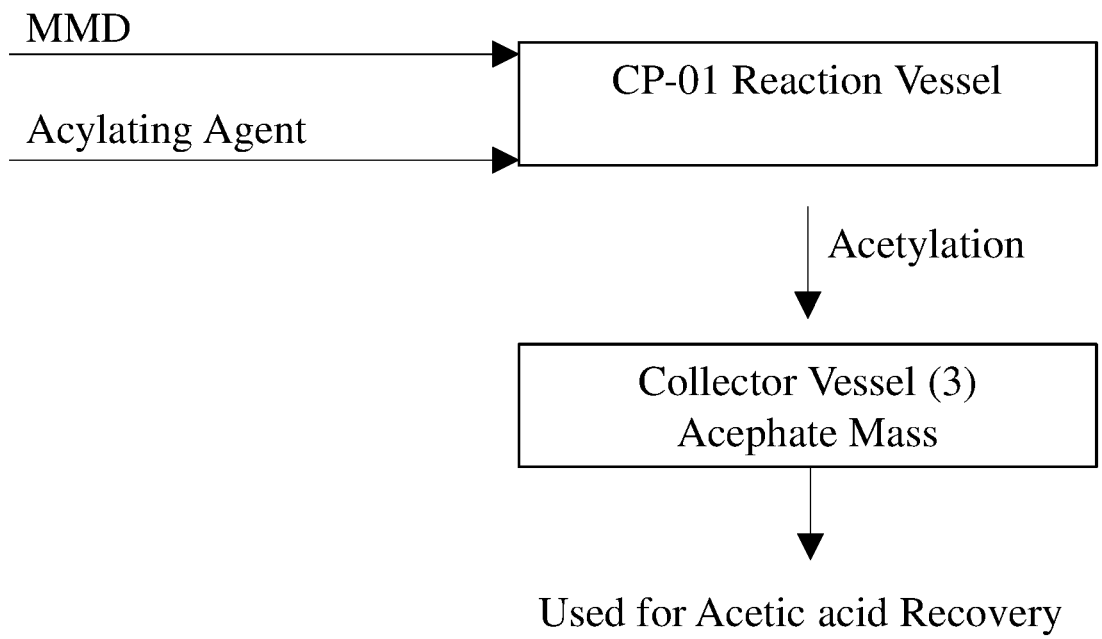
Figure 1C:
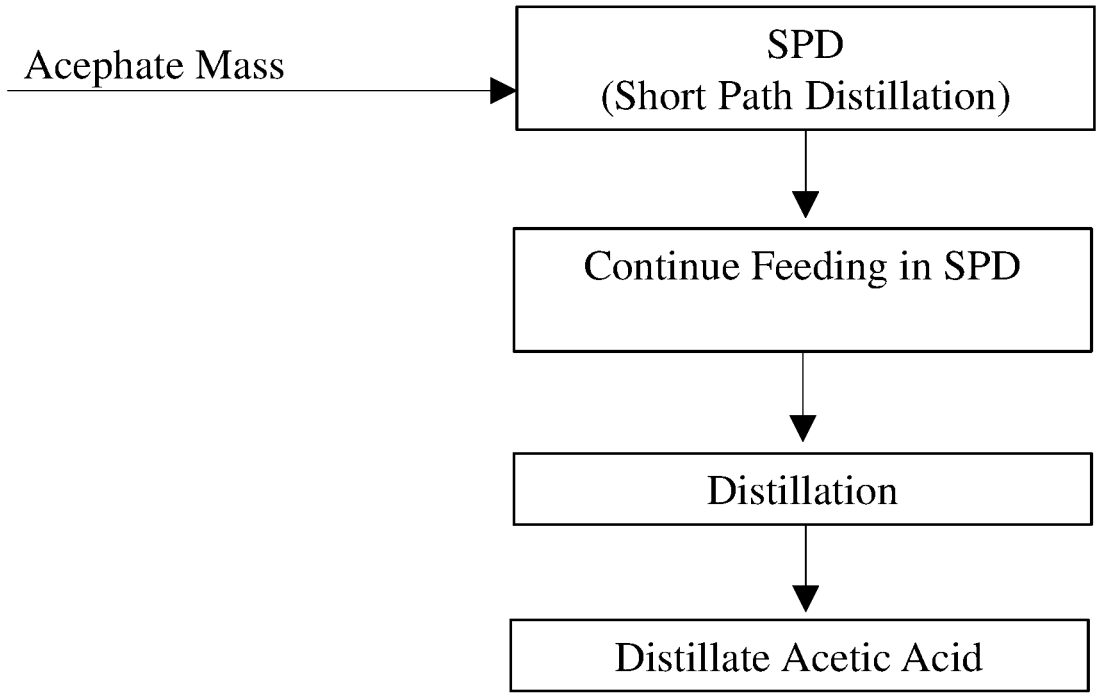
Figure 1D:
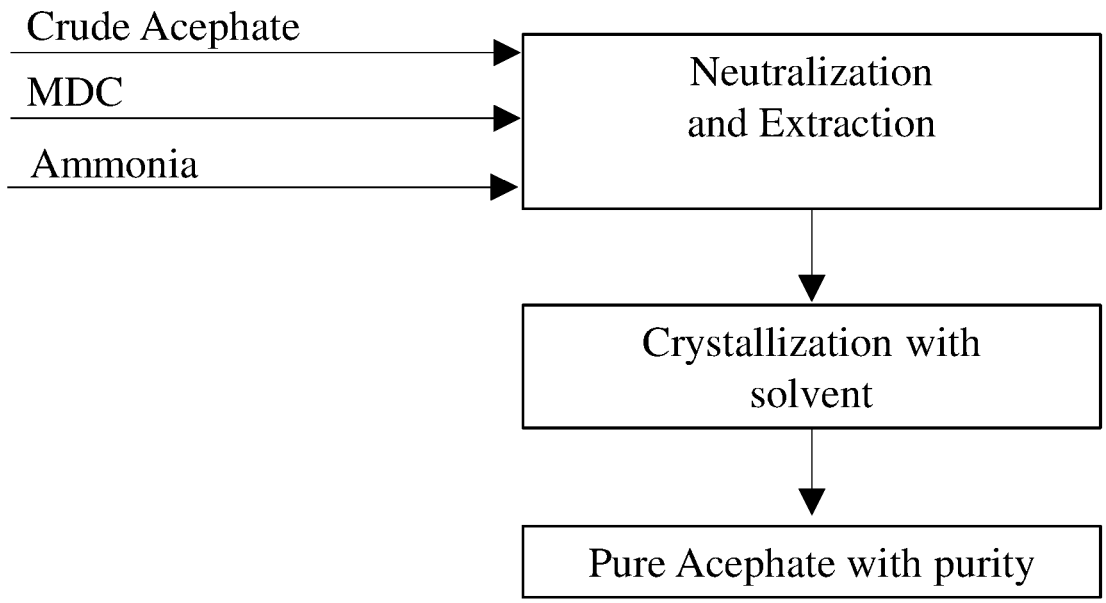

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

Broadly, this invention contemplates a process of preparing acephate further explained by the following reaction scheme:

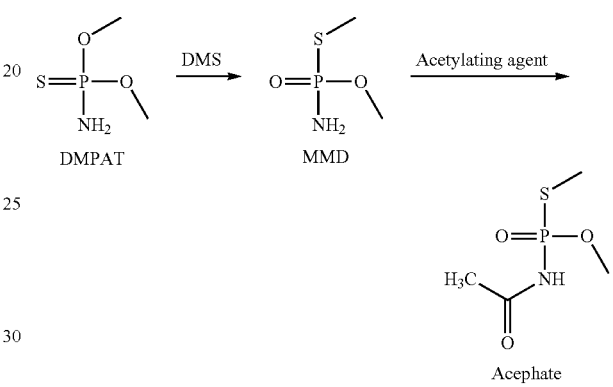

Scheme: 1

The present continuous flow process is beneficial over the traditional batch vessels with following advantages: (i) mass and heat transfer can be significantly improved by decreasing reactor size; (ii) fewer transport limitations can be offered by the feasibility and device flexibility of continuous flow synthesis; (iii) yield and selectivity can be improved due to the precise control of reaction variables such as temperature, pressure and residence time, (iv) scale-up of continuous flow synthesis is readily achieved by simply increasing the number of reactors or their sizes.

The present inventors motivated by these advantages and worked out a continuous flow synthesis in a microreactor system for the manufacture of acephate. The present inventors performed various continuous flow screening experiments and surprisingly arrived at a process which result in the maximum yield and high purity of acephate.

In an aspect the present invention provides a commercial process for production of acephate comprising a reaction selected from (i) isomerising DMPAT using dimethyl sulphate in a microreactor and continuously producing O,S-dimethyl phosphoramidothioate and (ii) acetylating O,S-dimethyl phosphoramidothioate in a microreactor and continuously producing acephate, at predetermined conditions of temperature and pressure and flow rate in a microreactor system.

According to present invention the reaction is clean and neat reaction and preferably carried out without solvent.

Accordingly the present invention provides a process for production of acephate comprising converting O, S-dimethyl phosphoramidothioate into acephate, wherein said O, S-dimethyl phosphoramidothioate is prepared continuously by reacting O, O-dimethyl phosphoramidothioate and dimethyl sulphate in a microreactor.

Advantageously production of acephate according to the present invention is continuously prepared in the absence of a solvent.

The microreactor used in the process according to the invention may comprise further functional units which exert additional functions in the chemical process regime. The configuration of such functional units is known to a person skilled in microreactor synthesis. For example, microreactor can be selected from the group comprising of Plug Flow Reactor (PFR), Continuous Stirred Tank Reactor (CSTR), Loop reactor, Packed Bed Reactor (PBR) and combinations thereof.

The microreactor system of the present invention can further comprise 1 to 100 parallel micro reaction systems in order to increase the production capacity. Typically, the microreactor systems comprise one or more mixing reactors, one or more reaction reactors, one or more mixing and reaction reactors, one or more heating and cooling element or any combinations thereof, which may be designed in such a way that it is jacketed to maintain desired temperature and pressure of the reaction vessels in the system.

The present invention has the advantage of short residence time of the material, high selectivity, high yield, less equipment investment, manufacturing cost savings, reduced material consumption, reducing the amount of by-products. Accordingly, the entire process is technically advanced over the conventional process, continuous, low energy consumption, an efficient and feasible continuous synthesis of acephate and intermediates thereof.

Thus, the present invention provides a micro-reactor synthesis in continuous operation for production of acephate in high yield and purity.

In accordance with this invention, there is provided a continuous flow process for preparation of acephate comprising the steps of:
  charging O, O-dimehyl phosphoramidothioate through a first line of a microreactor unit, in a continuous flow;
  charging dimethyl sulphate through a second line of the microreactor unit, in a continuous flow;
  reacting O, O-dimehyl phosphoramidothioate and dimethyl sulphate in a microreactor to form a product stream of O,S-dimethyl phosphoramidothioate.

In accordance with this invention, there is provided a continuous flow process for preparation of acephate comprising the steps of:
  charging O, O-dimehyl phosphoramidothioate through a first line of a
  microreactor unit, in a continuous flow;
  charging dimethyl sulphate through a second line of the microreactor unit, in a continuous flow;
  reacting O, O-dimehyl phosphoramidothioate and dimethyl sulphate in a microreactor to product of O,S-dimethyl form a stream phosphoramidothioate; and
  converting O,S-dimethyl phosphoramidothioate into acephate.

In another aspect of the present invention there is provided a continuous flow process for preparation of acephate comprising:
  charging O,S-dimethyl phosphoramidothioate through a first line of a microreactor unit, in a continuous flow;
  charging an acetylating agent through a second line of the microreactor unit, in a continuous flow;
  reacting O,S-dimethyl phosphoramidothioate with acetylating agent in a microreactor to form a product stream of acephate.

In another aspect of the present invention there is provided a continuous flow process for preparation of acephate comprising:
  i) charging O, O-dimehyl phosphoramidothioate through a first line of a microreactor unit, in a continuous flow;
  ii) charging dimethyl sulphate through a second line of the microreactor unit, in a continuous flow;
  iii) reacting O, O-dimehyl phosphoramidothioate and dimethyl sulphate in a microreactor to form a product stream of O,S-dimethyl phosphoramidothioate;
  iv) charging a stream of O,S-dimethyl phosphoramidothioate to a continuous microreactor, in a continuous flow;
  v) charging an acetylating agent to a continuous microreactor, in a continuous flow;
  vi) acetylating O,S-dimethyl phosphoramidothioate with acetylating agent in a microreactor to form a product stream of acephate.

The product stream containing acephate is then collected in a vessel connected to the microreactor. Typically pure acephate is isolated from the final product stream and simultaneously acetic acid recovered from the stream which is an additional advantage of the process. Thus, present process is simple, rapid and industrially viable.

A continuous flow process as used herein is not particularly limited and can be further modified by a person of ordinary skill in the art within the scope of invention. In general, for example and without limitation, a continuous flow process can allow a continuous flow of reactants that can be charged in a reactor, vessel or line, allowing mixing or reaction of the reactants in order to form products. This is followed by continuous flow (discharge) of the products from the reactor, vessel or line. Thus, a continuous flow process can be considered as a process where reactants are charged or fed into a reactor, vessel or line, while a product is simultaneously removed during part of the reaction process. A continuous flow process can allow a single step or multiple steps to be performed, where each step independently of the other can be a reaction, separation or purification.

The term "continuous" used herein refers to one or more reagent stream(s) that flow continuously from one reaction step to the next without an intervening isolation or purification step.

The term "line" as used herein is not particularly limited and should be known to a person of skill in the art. In general, a line refers to, for example and without limitation, a tube, conduit or pipe for conveying or transporting fluids. In a continuous flow process, the line can be designed to allow charging and/or discharging of fluids, such as reactants or products. In addition, the line (such as, in a reaction mixing line) can be designed to receive reactants and allow mixing and/or reaction of the reactants. Where the line is designed to receive reactants, the size and shape of the line can be adapted to enhance mixing and permit flow of the reactants into the line, minimizing back pressure.

The term "reactor" or "vessel" as used herein are not particularly limited and should be known to a person of skill in the art. In general, a reactor or vessel relates to, for example and without limitation, a container or vat designed to receive chemicals for a chemical process, such as a chemical reaction. In a continuous flow process, the reactor or vessel can be designed to receive continuous charge of the reactants, optionally, a residence time of the reactants within the reactor or vessel, to allow mixing and/or reaction of the reactants to form the products, followed by a continuous discharge of the products. The reactor or vessel can be provided with means, such as, an agitator or baffles to allow mixing of the reactants.

The term "residence time" used herein refers to the time it takes for a molecule in a reagent stream to travel the entire length of a microreactor. The residence time for a reagent stream in a microreactor may depend on the length and width of the microreactor as well as the flow rate of the reagent stream.

The term "solution" as used herein is not particularly limited and should be known to a person of skill in the art. In general, a solution is a homogeneous mixture composed of only one phase. In such a mixture, a solute is a substance dissolved in another substance, known as a solvent. The solvent does the dissolving. The solution more or less takes on the characteristics of the solvent including its phase and the solvent is commonly the major fraction of the mixture. The term solution as used herein can include a mixture having some solids that are not present in solution or insoluble in the solvent, so long as they do not interfere with the overall reaction and process.

The acetylating agent used in the present process is selected from Acetyl halides and Anhydrides, ketene, preferably the acetylating agent is Acetic Anhydride.

The process for the production of acephate and its intermediate according to the present invention is illustrated in following embodiments, but not limited to, the subsequent description and the figures/drawings referred therein.

Referring to FIG. 1, a schematic of an exemplary continuous flow reactor for synthesis of acephate, a microreactor is provided to perform the present process which is described as a Plug Flow Reactor (PFR) with reaction vessel (CP-01). The reaction vessel (CP-01) is designed in such a way that they are jacketed to maintain required temperature and pressure according to conditions of the reaction and it comprises a reaction chamber (6). Heating element HE (HE-01) is attached to the reaction vessel (CP-01) to provide requisite temperature indicated by temperature sensor (7). Feed container (1) and (2) holds the reactants separately and are connected to reaction vessel (CP01) through mixing lines (4) and (5) respectively. Pumps P1 and P2 are attached to these mixing lines such that it drives the reactants contained in the feed containers (1) and (2) to the reactor (CP-01). First mixing line (4), is connected to the reactor (CP-01) via pump (P-1). Second mixing line (5), is connected to the reactor (CP-01) via pump (P-2). The pressure element PG is connected to the reaction vessel (CP-01) to provide pressure indication during reaction. The reaction vessel (CP-01) is connected to collector vessel (3) from where the final product stream is collected. Preferably, the product stream containing acephate is then collected in a vessel connected to the microreactor.

Figure 3:
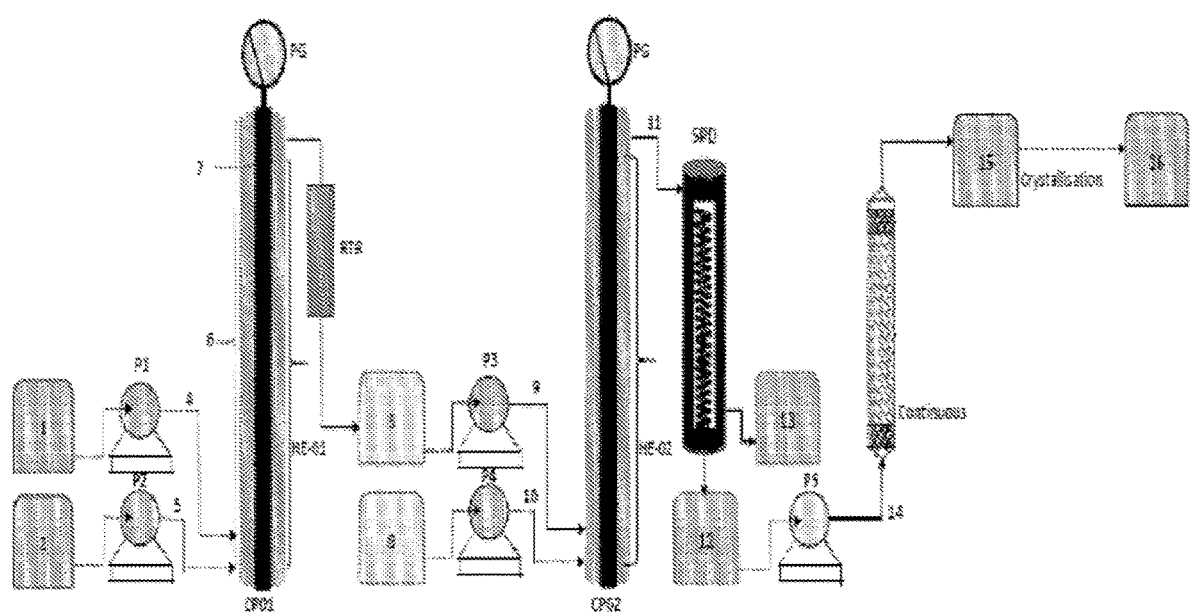
FIG. 3: It is a microreactor arrangement representing the present invention

Referring to FIG. 3, the microreactor described is a Plug Flow Reactor (PFR) with reaction vessel (CP-01) for stage-1 MMD and (CP-02) for stage-2 Acephate followed by SPD and then continuous extraction column. The reaction vessel (CP-01) is designed in such a way that they are jacketed to maintain required temperature and pressure according to conditions of the reaction and it comprises a reaction chamber (6). Heating element HE (HE-01) is attached to the reaction vessel (CP-01) to provide requisite temperature indicated by temperature sensor (7). Feed container (1) and (2) are connected to reaction vessel (CP01) as mixing lines (4) and (5) respectively and holds the reactants separately. Pumps P1 and P2 are attached to these mixing lines such that it drives the reactants contained in the feed containers (1) and (2) to the reactor (CP-01). First mixing line (4), is connected to the reactor (CP-01) via pump (P-1). Second mixing line (5), is connected to the reactor (CP-01) via pump (P-2). The pressure element PG is connected to the reaction vessel (CP-01) & (CP-02) to provide pressure indication during reaction. The reaction vessel (CP-01) is connected to RTR and then collector vessel (3) from where the final product (MMD) is collected. The feed container (3) and (8) are connected to reaction vessel (CP-02) as mixing lines (9) and (10) respectively and holds the reactants separately. Pumps P3 and P4 are attached to these mixing lines such that it drives the reactants contained in the feed containers (3) and (8) to the reactor (CP-02). First mixing line (9), is connected to the reactor (CP-02) via pump (P-3). Second mixing line (10), is connected to the reactor (CP-02) via pump (P-4). The reaction vessel (CP-02) is connected to discharge line (11) from where the acephate mass feeding to Short Path Distillation (SPD) for continuous distillation of Acetic Acid (13). The collector vessel (12) from where the final crude acephate is collected. Pumps P5 are attached to mixing line (14) in such a way that it drives the crude acephate mass from collector vessel (12) in the continuous extraction column to get MDC product layer which is then collected in collector vessel (15). The MDC layer in collector vessel (15) is then evaporated and crystallised to obtain purified Acephate Technical. (16).

In an embodiment the present invention also provides a process comprising continuous recovery of acetic acid in a continuous process for preparation of acephate as claimed in claim 1 wherein said acetic acid is recovered by short path distillation.

Figure 2:
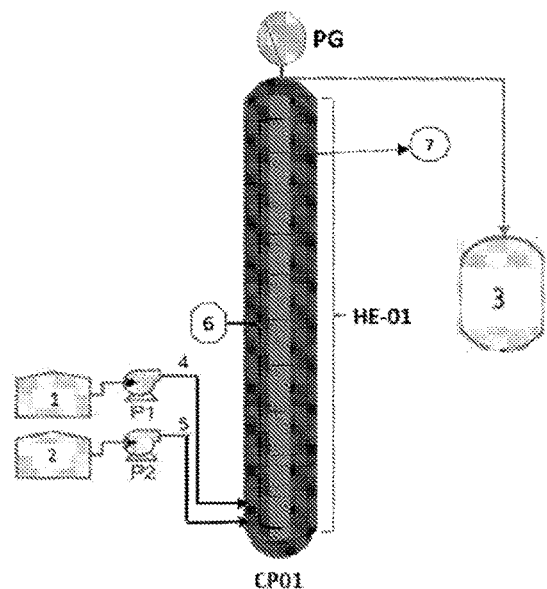
FIG. 2: It is a microreactor system according to one embodiment of invention.

In an embodiment, the microreactor system as represented in FIG. 2 comprises a loop reactor placed prior to Plug Flow Reactor such that the reactants are pre-mixed prior to flowing into Plug Flow Reactor to obtain pre-mix and the pre-mix is then allowed to pass through another PFR. The process for synthesis of acephate is carried out according to present invention, as described below.

In accordance with this invention, there is provided a continuous flow process for preparation of acephate in a microreactor system comprising the following steps:

Step 1: Isomerisation of O, O-dimehyl phosphoramidothioate to O,S-dimethyl phosphoramidothioate In this step O, O-dimethyl phosphoramidothioate is fed to a two-line PFR type flow reactor with Residence time reactor (RTR) by first dosing line at predetermined rate and dimethyl sulphate was fed to the reactor by second dosing line at the predetermined rate. All the two dosing lines discharge their contents in the reaction region which was maintained at about 50-100° C. MMD was formed within residence time of less than 15 min and collected. O, O-dimehyl phosphoramidothioate and dimethyl sulphate are charged in a continuous flow to the microreactor in a stoichiometric ratio of 1:0.10-0.20.

Step 2: Acylation of O,S-dimethyl phosphoramidothioate to Acephate

O,S-dimethyl phosphoramidothioate stage-1 solution is fed to a two-line PFR type flow reactor by first dosing line at the predetermined rate and acetylating agent is fed to the reactor by second dosing line at the predetermined rate. All the two dosing lines discharge their contents in the reaction region are maintained at 50-100° C. and a reaction mass with the desired product, Acephate within residence time of less than 10 min is collected.

Step 3: Recovery of Acetic Acid

The reaction mass obtained in step 2 is subjected to short path distillation to recover acetic acid. The distillate of acetic acid is collected, and remaining reaction mass is used for isolation of acephate.

Step 4: Isolation of pure acephate

The reaction mass with crude acephate from step 3 is neutralised and recrystallized using suitable solvent to get pure acephate with high purity.

In an embodiment the present invention provides a process comprising continuous production of acephate wherein the process is conducted in absence of solvent, said process comprising:
 i) charging O,S-dimethyl phosphoramidothioate through a first line of a microreactor unit, in a continuous flow;
 ii) charging an acetylating agent through a second line of the microreactor unit, in a continuous flow;
 iii) reacting O,S-dimethyl phosphoramidothioate with acetylating agent in a microreactor to form a product stream of acephate.

In an embodiment of the present invention, the continuous flow process for the synthesis of acephate is carried out in microreactors selected from the group comprising of Plug Flow Reactor (PFR), Continuous Stirred Tank Reactor (CSTR), Loop reactor, Packed Bed Reactor (PBR) and combinations thereof.

In an embodiment of the present invention, the continuous flow process for the synthesis of acephate is carried out in Plug Flow Reactor (PFR).

In an embodiment of the present invention, the continuous flow process for the synthesis of acephate is carried out in Loop Reactor.

In an embodiment of the present invention, the continuous flow process for the synthesis of acephate is carried out by combining Loop Reactor and Plug Flow Reactor (PFR) in series such that reactants are first allowed to get mixed in Loop Reactor to obtain pre-mix and the pre-mix is then allowed to pass through PFR.

According to an embodiment of the present invention, flow rate of reactants flowing from first line varies from 1 ml/min to 20 ml/min in a reactor up to 100 ml capacity.

According to an embodiment of the present invention, flow rate of reactants flowing from second line varies from 1 ml/min to 20 ml/min in a reactor up to 100 ml capacity.

According to an embodiment of the present invention, flow rate of reactants flowing from third line varies from 1 ml/min to 20 ml/min in a reactor up to 100 ml capacity.

According to an embodiment of the present invention, flow rate of reactants from first, second and third line may vary on the basis of desired output volume of the product.

According to an embodiment of the present invention, volume of microreactors for carrying out the continuous flow process for the synthesis of acephate at laboratory scale are selected from various capacity range of 1 ml, 10 ml, 50 ml, 100 ml and the like based on desired output volume of acephate.

According to an embodiment of the present invention, volume of microreactors for carrying out the continuous flow process for the synthesis of acephate at commercial scale are selected from various capacity range of 1 L, 10 L, 50 L, 100 L, 500 L, 1000 L, 2000 L, 5000 L, 50000 L and more which can be based on desired output volume of acephate.

According to some embodiments, synthesis of acephate occurs in shorter reaction time, relative to known methods.

In some embodiments, residence time of reactants in the reaction vessel to synthesize acephate may be about 1 hours or less, about 30 min or less or, in some cases, about 20 min or less.

According to an embodiment of the present invention, residence time of reactants in the reaction vessel to synthesize acephate is about 1 hour or less than 1 hour.

According to an embodiment of the present invention, residence time of reactants in the reaction vessel to synthesize acephate is about 30 minutes or less.

According to one preferred embodiment of the present invention, residence time of reactants in the reaction vessel to synthesize acephate may be about 6 min or less.

According to one preferred embodiment of the present invention, residence time is less than about 60 seconds.

According to one preferred embodiment of the present invention, residence time is about 30 seconds.

Without wishing to be bound by theory, such residence times may be attributed to increase in the rate of a chemical reaction within a microreactor, relative to other processes (e.g., batch processes), due to rapid mass and heat transfer, high temperatures, and high pressures attainable within a microreactor, as described more fully below.

In one embodiment the process for synthesis of acephate in high yield and purity comprises a step of reacting O, O-dimehyl phosphoramidothioate with dimethyl sulphate to form O,S-dimethyl phosphoramidothioate in a microreactor at a predetermined condition of temperature, pressure and flow rate of reactants.

The step of producing O,S-dimethyl phosphoramidothioate in the microreactor may be carried out at a temperature from about 50 to about 120° C. and a pressure from about 1 bar to about 10 bar.

According to an embodiment of the present invention, temperature of the reaction is about 90° C. to about 100° C. to produce O,S-dimethyl phosphoramidothioate in a continuous flow.

According to an embodiment of the present invention, reaction temperature is about 60 to 65° C.

According to the present invention, a microreactor process for producing O,S-dimethyl phosphoramidothioate comprises continuously flowing O, O-dimehyl phosphoramidothioate from first line and continuously flowing dimethyl sulphate from second line at predetermined temperature and present and flow rate to obtain O,S-dimethyl phosphoramidothioate. According to present invention O,S-dimethyl phosphoramidothioate thus produced is immediately converted into acephate by a process as described herein.

According to an embodiment of the present invention, flow rate of O, O-dimehyl phosphoramidothioate T flowing from first line varies from 1 ml/min to 20 ml/min in a reactor up to 100 ml capacity.

According to an embodiment of the present invention, flow rate of O, O-dimehyl phosphoramidothioate flowing from first line varies from 1 ml/min to 20 ml/min in a reactor up to 5000 lit capacity.

According to an embodiment of the present invention, flow rate of dimethyl sulphate flowing from second line varies from 1 ml/min to 20 ml/min in a reactor up to 100 ml capacity.

In an aspect of the present invention, a continuous flow process for preparation of acephate comprises steps of:
 charging O, O-dimehyl phosphoramidothioate through a first line of a microreactor unit, in a continuous flow;
 charging dimethyl sulphate through a second line of the microreactor unit, in a continuous flow;

reacting O, O-dimehyl phosphoramidothioate and dimethyl sulphate in a microreactor to form a product stream of O,S-dimethyl phosphoramidothioate and converting O,S-dimethyl phosphoramidothioate into acephate.

The product stream containing acephate is then collected in a vessel from the microreactor.

The feed streams of O, O-dimehyl phosphoramidothioate: dimethyl sulphate can be supplied to the microreactor in a stoichiometric ratio of 1:0.10-0.20

The feed streams of O, O-dimehyl phosphoramidothioate: dimethyl sulphate can be preferably supplied to the microreactor in a stoichiometric ratio of 1:0.15.

The process of the present invention provides acephate having purity at least 90% by HPLC.

The process of the present invention provides acephate having purity at least 95% by HPLC.

The process of the present invention provides acephate with an high yield of at least 80% and high purity of more than 95%, preferably more than 98%.

Preferably, acephate produced according to the present invention has purity 98.5%.

According to an embodiment of the present invention, in the continuous flow, a loop reactor is attached prior to Plug Flow Reactor such that loop reactor and Plug Flow Reactor are placed in series as adjacent to each other and are attached via line.

In an aspect of the present invention the continuous flow process for preparation of acephate comprising:
  charging O,S-dimethyl phosphoramidothioate through a first line of a microreactor unit, in a continuous flow;
  charging an acetylating agent through a second line of the microreactor unit, in a continuous flow;
  reacting O,S-dimethyl phosphoramidothioate with acetylating agent in a microreactor to form a product stream of acephate.

According to an embodiment of the present invention, flow rate of O,S-dimethyl phosphoramidothioate flowing from first line to the loop reactor varies from 1 ml/min to 10 ml/min in a reactor having 20 ml capacity.

According to an embodiment of the present invention, flow rate of acetylating agent solution flowing from second line to the loop reactor varies from 1 ml/min to 20 ml/min in a reactor having 30 ml capacity.

In an embodiment the present process can be easily scale up in loop reactor volume of 20 L or even more based on desire output of acephate volume.

According to an embodiment of the present invention, output rate of acephate from reactor of 30 ml capacity is from about 5 ml/min to about 30 ml/min.

According to an embodiment, the residence time in microreactor for the synthesis of O,S-dimethyl phosphoramidothioate in continuous flow process is from about 10 sec to 10 min.

According to another embodiment of the present invention, the reaction temperature in the microreactor is maintained at about 65° C.

According to an embodiment of the present invention, the acephate and its intermediates synthesized in continuous flow may be used in synthesizing various chemical, pharmaceutical and agrochemical compounds.

Although the subject matter has been described in considerable detail with reference to certain preferred embodiments thereof, other embodiments are possible. As such, the spirit and scope of the disclosure should not be limited to the description of the preferred embodiment contained therein.

In an embodiment the present invention provides a system comprising a microreactor unit for producing acephate by continuous flow process wherein the process is conducted in absence of solvent.

In an embodiment the present invention provides a system comprising a microreactor unit for producing acephate by continuous flow process wherein
  i) charging O, O-dimehyl phosphoramidothioate through a first line of a microreactor unit, in a continuous flow;
  ii) charging dimethyl sulphate through a second line of the microreactor unit, in a continuous flow;
  iii) reacting O, O-dimehyl phosphoramidothioate and dimethyl sulphate in a microreactor to form a product stream of O,S-dimethyl phosphoramidothioate;
  iv) charging a stream of O,S-dimethyl phosphoramidothioate to a continuous microreactor, in a continuous flow;
  v) charging acetylating agent to a continuous microreactor, in a continuous flow;
  vi) acetylating O,S-dimethyl phosphoramidothioate with acetylating agent in a microreactor to form a product stream of acephate.

Advantages of the Present Invention

The present continuous-flow process is simple, fast, high efficiency and easy operation.

The process is continuously carried out by continuously adding fresh reactants without interruption i.e. continuously flowing throughout the process for production of desired product.

Advantageously, the reaction time of the process can be brought down to within 30 second to 6 minutes by present process thereby reducing both cost and operating step of the process.

The present continuous-flow process is performed in continuous mode without solvent. Reaction without solvent is very difficult due to high exothermicity in batch process. In continuous process without solvent reaction can be followed and problem such as degradation of acephate, exothermicity, low yield and Acetic acid recovery are solved.

Thus, the present invention involves technical advance as compared to the existing knowledge or having economic significance or both and that makes the invention not obvious to a person skilled in the art.

In the present process recovery of Acetic Acid is carried out by using SPD without decomposition of final Acephate.

The product obtained is in high yield with high purity.

The present continuous-flow process is simple, fast, high efficiency and easy operation.

The present continuous flow process involves continuous production of acephate in a reactor of micro-sized thereby making the material mixing and mass transfer easy and industrially feasible.

The process is continuously carried out by continuously adding fresh reactants without interruption i.e. continuously flowing throughout the process for production of desired product.

Advantageously, the reaction time of the process can be brought down to within 30 second to 5 minutes by present process thereby reducing both cost and operating step of the process.

The following are provided as specific embodiments of the present invention. Other modifications of this invention will be readily apparent to those skilled in the art. Such modifications are understood to be within the scope of this invention. The invention is illustrated by the following Examples which however do not limit the invention.

Example 1

General Process for Preparation of Acephate

Step 1: This stage was performed in a PFR type Flow Reactor (50 ml) with two inlet and one outlet, circulation of oil through and temperature controller. The temperature of reactor was set to 60-65° C. by heating. O, O-dimehyl phosphoramidothioate feeding was started through first inlet and then dimethyl sulphate feeding was started through second inlet at predetermined flow rate (stochiometric ratio 1:0.15). The reaction is continued for residence time of 6 minutes and O,S-dimethyl phosphoramidothioate mass was collected from outlet continuously.

Step 2: This stage was performed in a PFR type Flow Reactor (50 ml) provided with two inlet and one outlet along with back pressure regulator, circulation of oil through jacket and temperature controller.

The reactor was heated to 40-50° C. O,S-dimethyl phosphoramidothioate (collected from Step-1) was fed to the reactor through first inlet and then a premix mixture of acetic anhydride+$H_2SO_4$ was fed through second inlet at predetermined flow rate. The reaction is continued for residence time of 4 minutes and reaction mass was collected from outlet.

Step 3: This stage is performed in 0.04M2 Glass SPD equipment arranged with heating oil circulation, chiller for condenser, vacuum pump and addition funnel.

The reactor was heated to 90-95° C. and chiller at −10° C. The reaction mass obtained from stage-2 was added to SPD and acetic acid from the mixture was distilled out to obtain crude Acephate mass.

Step 4

After completion of addition, bottom product containing crude acephate was collected and methylene dichloride was added to it. The mixture was neutralized using liquor ammonia solution. The separated aqueous layer was extracted with methylene dichloride. The organic layer was evaporated to get acephate. Crystalizing acephate with ethyl acetate at −5° C. to −10° C. to obtain acephate crystal.

The reaction parameters used for various reactions are provided in the following table.

Example 2

Process for Preparation of O,S-Dimethyl Phosphoramidothioate

The process was performed in a PFR type flow Reactor (50 ml) with two inlet and one outlet, circulation of oil through and temperature controller. The temperature of reactor was set to 65° C. by heating. O, O-dimehyl phosphoramidothioate (95%, 600 g) feeding at the rate of 7.4 ml/min was started through first inlet and then dimethyl sulphate (83 g) feeding was started through second inlet at the rate of 0.94 ml/min. The reaction is continued for residence time of 6 minutes and O,S-dimethyl phosphoramidothioate mass was collected from outlet continuously.

Purity: 90% by GC

Example 3

Preparation of Acephate

The process was performed in a PFR type flow Reactor (50 ml) provided with two inlet and one outlet along with back pressure regulator, circulation of oil through jacket and temperature controller.

The reactor was heated to 50° C. O,S-dimethyl phosphoramidothioate (683 g, collected from example 2) was fed to the reactor through first inlet at the rate of 6.75 ml/min, and then a premix mixture of acetic anhydride+$H_2SO_4$ (433 g+13.4 g) was fed through second inlet at the rate of 5.75 ml/min. The reaction is continued for residence time of 4 minutes and reaction mass was collected from outlet.

The reaction mass (1129 g) was then subjected to 0.04M2 Glass SPD equipment arranged with heating oil circulation, chiller for condenser, vacuum pump and addition funnel for short path distillation for 54 minutes with 20 g/min flow rate and at temperature 90° C. Acetic acid (230 g) was distilled out and recovered from the reaction mixture. The bottom mass (899 g) containing crude acephate was used for isolating pure acephate.

The reaction mass (899 g) obtained above was neutralized with (1200 g) MDC, (225 g) water and (196 g, 20%) liquor ammonia by maintaining temperature to 15-20° C. The separated aqueous layer was extracted with MDC (4×400 g). Combined organic layer was evaporated to constant weight.

| Reaction | Capacity of reactor (Lit) | Rate of DMPAT (Lit/hr) | Rate of DMS (Lit/hr) | Residence time (min) | Rate of MMD (Lit/hr) | Rate of Acylating reagent (Lit/hr) | Residence time (min) |
|---|---|---|---|---|---|---|---|
| | | | Isomerization | | | Acetylation | |
| 1 | 0.05 | 0.444 | 0.0564 | 6.0 | 0.405 | 0.345 | 4.0 |
| 2 | 0.1 | 0.888 | 0.1128 | 6.0 | 0.81 | 0.69 | 4.0 |
| 3 | 1 | 8.88 | 1.128 | 6.0 | 8.1 | 6.9 | 4.0 |
| 4 | 2 | 17.76 | 2.256 | 6.0 | 16.2 | 13.8 | 4.0 |
| 5 | 5 | 44.4 | 5.64 | 6.0 | 40.5 | 34.5 | 4.0 |
| 6 | 10 | 88.8 | 11.28 | 6.0 | 81 | 69 | 4.0 |
| 7 | 50 | 444 | 56.4 | 6.0 | 405 | 345 | 4.0 |
| 8 | 500 | 4440 | 564 | 6.0 | 4050 | 3450 | 4.0 |
| 9 | 1000 | 8880 | 1128 | 6.0 | 8100 | 6900 | 4.0 |
| 10 | 2000 | 17760 | 2256 | 6.0 | 16200 | 13800 | 4.0 |
| 11 | 5000 | 44400 | 5640 | 6.0 | 40500 | 34500 | 4.0 |

The isomerization and acetylation steps are performed in continuous mode.

The mass was crystallized using ethyl acetate (700 g) at −5° C. to −10° C. obtain Acephate crystals (571 g) and dried.

Yield: 76%: Purity: 98% by HPLC

Example 4

Process for Preparation of Acephate
Step 1

The process was performed in a PFR type flow Reactor (50 ml) with two inlet and one outlet, circulation of oil through and temperature controller. The temperature of reactor was set to 65° C. by heating. DMPAT 95% (558 ml) feeding at the rate of 7.4 ml/min was started through first inlet and then dimethyl sulphate (62.4 ml) feeding was started through second inlet at predetermined flow rate (stochiometric ratio 1:0.15). The reaction is continued for residence time of 6 minutes and O,S-dimethyl phosphoramidothioate mass is fed continuously in another PFR.
Step 2

A PFR type flow reactor (50 ml) provided with two inlet and one outlet along with back pressure regulator, circulation of oil through jacket and temperature controller was heated to 50° C. O,S-dimethyl phosphoramidothioate from step 1 was fed to the reactor through first inlet and then a premix mixture of acetic anhydride+$H_2SO_4$ (401 ml+12 ml) was fed through second inlet at predetermined flow rate. The reaction is continued for residence time of 4 minutes.

The reaction mass was then taken in 0.04M2 Glass SPD equipment arranged with heating oil circulation, chiller for condenser, vacuum pump and addition funnel for short path distillation for 54 minutes at temperature 90° C. and chiller at −10° C. Acetic acid (192 ml) was distilled out and recovered from the reaction mixture. The bottom mass (899 g) containing crude acephate was separated and pure acephate was isolated.
Step 3

The reaction mass (899 g) obtained above was neutralized with (900 ml) MDC and (196 ml, 20%) liquor ammonia by maintaining temperature to 15-20° C. The separated aqueous layer was extracted with MDC (4×300 ml). Combined organic layer was evaporated to constant weight. The mass was crystallized using ethyl acetate (875 ml) at −5° C. to −10° C. obtain Acephate crystals (586 g) and dried.

Yield: 79%: Purity: 98% by HPLC

Inventors of the present invention thus successfully prepared acephate and its intermediates in a continuous flow in the microreactor system. The process described above can synthesize acephate very quickly under controlled conditions. Although the subject matter has been described in considerable detail with reference to certain preferred embodiments thereof, other embodiments are possible. As such, the spirit and scope of the disclosure should not be limited to the description of the preferred embodiment contained therein.

The invention claimed is:

1. A process for production of acephate comprising converting O, S-dimethyl phosphoramidothioate into acephate, the process comprising:
  i) charging O, O-dimethyl phosphoramidothioate to a microreactor unit through a first line of the microreactor unit;
  ii) charging dimethyl sulphate to the microreactor unit through a second line of the microreactor unit;
  (iii) reacting O, O-dimethyl phosphoramidothioate and dimethyl sulphate in the microreactor unit to form a product stream of O, S-dimethyl phosphoramidothioate; and
  (iv) converting the O, S-dimethyl phosphoramidothioate into acephate
  wherein said O, S-dimethyl phosphoramidothioate is prepared continuously by reacting O, O-dimethyl phosphoramidothioate and dimethyl sulphate in the microreactor unit, and
  wherein the acephate is continuously prepared in an absence of solvent.

2. The process as claimed in claim 1, wherein said process is a continuous flow process and the microreactor unit is selected from the group consisting of a Plug Flow Reactor (PFR), a Continuous Stirred Tank Reactor (CSTR), a Loop reactor, a Packed Bed Reactor (PBR), and combinations thereof.

3. The process as claimed in claim 1, wherein the O, O-dimethyl phosphoramidothioate and dimethyl sulphate are charged in a continuous flow to the microreactor in a stoichiometric ratio of 1:0.10-0.20.

4. The process as claimed in claim 1, wherein a residence time of the reactants in the process is from about 30 seconds to 1 hour.

5. The process as claimed in claim 1, wherein a temperature of the reaction is from about 50° C. to about 120° C.

6. The process as claimed in claim 1, wherein pressure of a reaction vessel of the microreactor is from about 1 to about 10 bar.

7. The process as claimed in claim 1, wherein the acephate produced has a purity of at least 98%.

8. The process as claimed in claim 1, wherein said conversion of acephate comprises reacting the O,S-dimethyl phosphoramidothioate with an acetylating agent in the microreactor unit to form a product stream of acephate.

9. The process as claimed in claim 8, wherein said acetylating agent is selected from acetyl halides, acetyl anhydrides, and ketenes.

10. A continuous flow process for producing acephate, comprising:
  i) charging O, S-dimethyl phosphoramidothioate formed in claim 1 through the first line of the microreactor unit, in a continuous flow;
  ii) charging an acetylating agent through a second line of the microreactor unit, in a continuous flow; and
  (iii) reacting O, S-dimethyl phosphoramidothioate with the acetylating agent in the microreactor unit to form a product stream of acephate;
  wherein the acephate is continuously prepared in an absence of solvent.

11. The process of claim 1, wherein said acetic acid is recovered by short path distillation.

12. A system comprising a microreactor unit for producing acephate by continuous flow process as claimed in claim 1, wherein the system is configured for:
  i) charging O, O-dimethyl phosphoramidothioate through a first line of the microreactor unit, in a continuous flow;
  ii) charging dimethyl sulphate through a second line of the microreactor unit, in a continuous flow;
  iii) reacting O, O-dimethyl phosphoramidothioate and dimethyl sulphate in the microreactor unit to form a product stream of O,S-dimethyl phosphoramidothioate;
  iv) charging the product stream of O,S-dimethyl phosphoramidothioate to a second continuous microreactor through a first line, in a continuous flow;
  v) charging an acetylating agent to the second continuous microreactor, in a continuous flow; and vi) acetylating O,S-dimethyl phosphoramidothioate with the acetylating agent in the microreactor unit to form a product stream of acephate collected in a collector vessel, wherein the process is conducted in an absence of a solvent.

* * * * *